United States Patent [19]

Müller et al.

[11] 4,282,190

[45] Aug. 4, 1981

[54] PROCESS FOR THE MANUFACTURE OF IRON AND ALUMINUM-FREE ZINC CHLORIDE SOLUTIONS

[75] Inventors: Wolfgang Müller, Mannheim; Lothar Witzke, Brühl, both of Fed. Rep. of Germany

[73] Assignee: Th. Goldschmidt AG, Essen, Fed. Rep. of Germany

[21] Appl. No.: 92,535

[22] Filed: Nov. 8, 1979

[30] Foreign Application Priority Data

Nov. 11, 1978 [DE] Fed. Rep. of Germany ....... 2849004

[51] Int. Cl.³ .................. C01G 9/04; C01G 49/06; C01F 7/34
[52] U.S. Cl. .................. 423/104; 423/123; 423/127; 423/141
[58] Field of Search ............... 423/101, 104, 140, 141, 423/123, 127

[56] References Cited

U.S. PATENT DOCUMENTS

| | | | |
|---|---|---|---|
| 981,451 | 1/1911 | McKechnie | 423/141 |
| 1,047,826 | 12/1912 | McKechnie | 423/141 |
| 3,600,128 | 8/1971 | Schulze | 423/101 |
| 4,044,096 | 8/1977 | Queneau | 423/150 |

*Primary Examiner*—Brian E. Hearn

[57] ABSTRACT

A process for the removal of iron and aluminum values from acidic solutions thereof with zinc chloride wherein the solution is subjected to pressure hydrolysis to precipitate the iron and aluminum as the hydroxides or oxide hydrates, and then the precipitate is removed and washed. Zinc chlorides which are particularly free from iron and aluminum can be rapidly and easily obtained with this process.

6 Claims, No Drawings

PROCESS FOR THE MANUFACTURE OF IRON AND ALUMINUM-FREE ZINC CHLORIDE SOLUTIONS

BACKGROUND OF THE INVENTION

1. Field of the Invention

This invention relates to a process for the manufacture of iron and aluminum-free, highly concentrated, aqueous, acidic zinc chloride solutions resulting from the separation of the aluminum and the iron from mixed solutions of these elements.

2. Description of the Prior Art

At the present time, large quantities of technical zinc chloride are obtained from waste products. These include ammonium chloride slag, zinc ash, pickling solutions, zinc chloride-containing waste liquors from the cellulose industry, etc. The zinc content of these waste products fluctuates between 40 and 80%. After treatment in the conventional manner with hydrochloric acid, 30 to 50%, and usually about 40% zinc chloride-containing crude liquors are obtained. These frequently must be freed from impurities and especially extraneous metal ions, such as, iron and aluminum.

In the processes presently used, the bivalent iron is first oxidized to trivalent iron using suitable oxidizing agents, such as, hydrogen peroxide, chlorate or permanganate. Alkali hydroxides or carbonates are used for the subsequent separation of the trivalent iron and the aluminum portion in the form of hydroxides. However, in order to not introduce any extraneous ions, zinc oxides or basic zinc salts are preferred as precipitation or neutralization agents. At a pH of 3.5 to 4, iron and aluminum hydroxides are then precipitated on heating to 80° to 100° C. After decanting and filtering, the precipitated and washed deposits are isolated.

The isolation of the deposits is particularly difficult, and, at times, even practically impossible, if the zinc chloride-containing cooled liquor contains a relatively large amount of aluminum. The deposits formed by the precipitation occupy a large value. As a result, their filtration proceeds so slowly that isolation of the metal values is economically possible. In addition, a considerable amount of zinc chloride which cannot be washed out, is retained in these voluminous precipitates.

When isolating crude zinc chloride liquors with low aluminum contents, filtration outputs or rates which are practically justifiable are $<100$ l/m$^2$/hour. In the absence of aluminum, filtration rates of $>200$ l/m$^2$/hour are achieved.

In practice, zinc chloride liquors can be processed only if the weight ratio of the iron portion to the aluminum portion is of the order of 4:1. In the case of a lower iron: aluminum ratio, such as, 4:2, the filtration and washing of the highly voluminous precipitate which is formed is practically impossible. Accordingly, zinc raw materials could not previously be worked up by wet chemical means.

SUMMARY OF THE INVENTION

We have discovered a process in which the difficulties encountered in the separation of iron and aluminum precipitates are avoided and the filtration properties (high filtration rate and a low loss of adhering zinc chloride in the precipitate) are improved so that even zinc raw materials with a high aluminum content can be processed by wet chemical means.

More particularly, in the present process, the following steps are carried out:
  (a) treating the solution for a period of from about 0.1 to 3 hours at a pH of about 1.5 to 3 at a temperature from about 105° to 260° C. and a pressure of from 6 to 48 bar to convert the iron and aluminum values to the hydroxide or oxide hydrate,
  (b) rapidly cooling the reaction mixture to form a precipitate and
  (c) separating the precipitate from the solution.

Optionally, steps can be taken to maintain the iron in the trivalent state by the addition of an oxidizing agent or increasing the partial pressure of oxygen above the mixture. Also, if desired, the final solution can be again subjected to the process.

DESCRIPTION OF THE PREFERRED EMBODIMENT

With the help of this so-called high-temperature pressure hydrolysis, the trivalent foreign metals, in this case, aluminum and iron, are separated from the bivalent zinc. Furthermore, iron and aluminum are precipitated in the form of their oxide hydrates while the zinc remains in solution. In an acidic medium, an excellent separation is achieved between these two metals.

The separation is all the more quantitative, the more rapidly the reaction mixture is cooled from the reaction temperature to a temperature of 120° to 100° C. This can be accomplished very quickly by withdrawing the latent heat from the suspension by rapidly releasing the pressure, for example, when removing the suspension from the pressure vessel. At the same time, the reaction mixture is concentrated as a result of the evaporating water. The precipitated deposit can be filtered off rapidly and easily because the precipitated components are present in a microcrystalline state. The washing of the iron and aluminum-containing deposit, which is present in such a form, also presents no difficulties. Practically no zinc adheres to the residue.

If the starting solution does not have the pH of 1.5 to 3 as required in the inventive process, it can be adjusted to the desired pH with neutralizing agents. Suitable neutralizing agents for this purpose may be alkalis, such as, alkali hydroxide, or alkali carbonate. However, the use of zinc oxide or of basic zinc salts has also proven to be advantageous, because then, additional foreign ions are not brought into the solution to be worked up.

During the subsequent high temperature pressure hydrolysis, it is advantageous to add an oxidizing agent to the solution or suspension or to supply oxygen during the precipitation, in order to convert the iron to the easily separable trivalent form and/or to keep it in this valency state. In the application of the process, it is possible to remove iron and aluminum rapidly and without difficulty, even from zinc chloride solutions with a high aluminum content, and to obtain zinc chloride solutions which are practically free from iron and aluminum.

In the case of iron and aluminum contents of about 0.1 mole/l of iron and aluminum in the crude liquor, it is sufficient to carry out the process once in order to obtain an almost 100 percent separation of the iron and aluminum.

However, if the iron and aluminum contents of the crude liquors to be processed are greater than 0.1 mole/l, so much free acid is produced during the high-temperature pressure hydrolysis, that the pH falls below 1.0 and the iron and aluminum are therefore no longer completely precipitated. In these cases, the pH of the hydrolysate obtained is adjusted once again to 1.5 to 3 and the inventive process is repeated. For example, it was observed when processing crude liquors with iron and aluminum contents greater than 0.1 mole/l, about 90% of the aluminum and 70% of the iron are precipitated in the first step of the process and the remainder in the repetition. After this step of the process, the zinc chloride liquor is free from aluminum and iron.

Zinc chloride solutions, contaminated with iron and aluminum, can be purified by the inventive process, no matter what their aluminum and iron contents may be. The iron and aluminum hydroxide precipitates can be filtered readily and include practically no zinc chloride.

The following examples illustrate the present invention. Example 1 shows the separation of iron and aluminum from a zinc chloride solution containing less than 0.1 moles/l of these metals. In Example 2, the separation of iron and aluminum from a zinc chloride solution with iron and aluminum contents greater than 0.1 moles/l is shown. In the comparison examples corresponding to the conventional process, the poor filterability of the iron and aluminum hydroxides is shown and the zinc content of the residue is determined.

As used herein, all percentages are expressed as weight percent based on the weight of the total solution.

EXAMPLE 1

As the test solution, an approximately 40% aqueous hydrochloric acid solution of crude zinc chloride containing 1.2 g/l of aluminum and 2.0 g/l of iron(III) in the form of their chlorides and having a pH of the solution of 2.2 was used.

Of this solution, 2,000 parts by volume were stirred for one half hour at 200° C. and 16 bar in a laboratory autoclave. The solution was then rapidly cooled (5 minutes) by releasing the pressure in the autoclave and the residue was filtered and washed. The specific filtration rate was 260 l/m$^2$/hour. The filtrate of 2,000 parts by volume (including the wash water) had a pH of 1.2 and contained only 0.015 g/l of aluminum as well as 0.022 g/l of iron in the form of their chlorides.

The moist filter cake (30.2 parts by weight) contained 45% moisture. The dry residue had 23.8 weight percent of iron,
14.2 weight percent of aluminum in the form of their oxide hydrates, and
only traces of included zinc salt.

COMPARISON EXAMPLE

The same initial solution as in Example 1 was mixed with zinc oxide at 90° C. with stirring, until a pH of 4.5 was reached which was sufficient for precipitating practically all of the iron(III) and aluminum in the form of their hydroxides.

The subsequent filtration yielded a rate of 120 l/m$^2$/hour as well as 2,100 parts by volume of filtrate (including the wash water). The residue, with a moisture content of 72 weight percent contained after drying 19.4 weight percent of iron,
11.5 weight percent of aluminum, and
9.8 weight percent of zinc in the form of their hydroxides.

EXAMPLE 2

As the test solution, an approximately 40 weight percent, aqueous hydrochloric acid solution of crude zinc chloride with a pH of 3.0, contained 4.5 g/l of aluminum and 2.5 g/l of iron(III) as chlorides was used.

Of this solution, 2000 parts by volume were treated for one hour at 250° C. and 48 bar in a laboratory autoclave and, after cooling within 5 minutes, filtered.

By using a flocculant, the reddish brown precipitate could be flocculated within seconds and filtered rapidly. The specific filtration rate was 450 l/m$^2$/hour. The clear zinc chloride solution had a pH of 0.8 and contained only 0.37 g/l of aluminum and 0.8 gl/l of iron in the form of the chlorides.

By such a procedure, 92% of the aluminum and 68% of the iron were removed in this first step of the process.

In order to remove the remainder of the aluminum and of the iron, the clear solution, which had a pH of 0.8, was brought back to a pH of 3.0 and then subjected once again to the aforementioned process. In so doing, the solution was left for one hour at 250° C. and 48 bar in the autoclave and then, after rapid cooling (within 5 minutes), the precipitated residue was filtered off and washed. The aluminum and iron contents of the clear filtrate now amounted to only 0.004 and 0.008 g/l, respectively. The total dried residue (first and second treatment) amounted to 35 parts by weight and contained 14.1 weight percent of iron,
25.5 weight percent of aluminum in the form of their oxide hydrates and traces of included zinc salt.

COMPARISON EXAMPLE

The same initial solution as in Example 2 was mixed with zinc oxide at 90° C. with stirring until the pH reached a value of 4.5, which is sufficient to precipitate all of the iron(III) and aluminum in the form of their hydroxides.

Even after the addition of a flocculant, no sedimentation was observed after one hour. The very voluminous slurry was difficult to filter. The filtration rate was less than 50 l/m$^2$/hour. The voluminous filtercake (209 parts by weight) contained 78 weight percent of moisture. The dry, washed residue contained 10.7 weight percent of iron,
19.4 weight percent of aluminum and still
12.3 weight percent of zinc in the form of the hydroxides.

What is claimed is:

1. A process for the removal of iron and aluminum values from acidic solutions thereof with zinc chloride comprising:
   (a) treating the solution for a period of from about 0.1 to 3 hours at a pH of about 1.5 to 4 at a temperature from about 150° to 260° C. and a pressure of from 6 to 48 bar to convert the iron and aluminum values to the hydroxide or oxide hydrate,
   (b) rapidly cooling the reaction mixture to form a precipitate, and
   (c) separating the precipitate from the solution, and then subjecting the separated solution to steps (a), (b), and (c) again.

2. The process of claim 1 wherein an oxidizing agent is added to the reaction mixture before the treatment to convert or maintain the iron in the trivalent state.

3. The process of claim 1 wherein the oxygen partial pressure above the reaction mixture is increased to convert or maintain the iron in the trivalent state.

4. The process of claim 1, 2, or 3 wherein the rapid cooling is achieved by suddenly releasing the pressure over the reaction mixture.

5. The process of claim 1, 2, or 3 wherein the reaction mixture is cooled to about 100° to 120° C.

6. The process of claim 1, 2, or 3 wherein the pH of the solution is adjusted to the range from 1.5 to 3 by the addition of a neutralizing agent selected from the group consisting of alkali hydroxides, alkali carbonates, basic zinc salts and zinc oxide.

* * * * *